March 24, 1970    J. L. JOHNSON    3,502,094

FLUID LOGIC CIRCUIT

Filed March 16, 1967

INVENTOR.
JEROME L. JOHNSON

BY
ATTORNEY

United States Patent Office 3,502,094
Patented Mar. 24, 1970

1

3,502,094
FLUID LOGIC CIRCUIT
Jerome L. Johnson, St. Paul, Minn., assignor to Honeywell Inc., Minneapolis, Minn., a corporation of Delaware
Filed Mar. 16, 1967, Ser. No. 623,663
Int. Cl. F16c 4/00
U.S. Cl. 137—81.5      5 Claims

ABSTRACT OF THE DISCLOSURE

This disclosure describes a pure fluid logic circuit having an analog output which is proportional to the product of functions of two input parameters. The logic circuit comprises a signal source which produces fluid pulses whose repetition rate is proportional to a function of a first parameter, a pulse forming device which converts the pulses from the signal source into pulses having a like repetition rate and having a pulse duration which is proportional to a function of a second parameter, and a fluid capacitor which converts the pulses from the pulse forming device into an analog output.

---

The invention herein described was made in the course of or under a contract, or subcontract thereunder with the U.S. Air Force.

BACKGROUND OF THE INVENTION

This invention relates generally to fluid handling apparatus, and more specifically to pure fluid sensing and logic circuits.

Pure fluid devices are attractive for use in monitoring and control systems because of their relative simplicity, high reliability and exceptional environmental tolerance. In addition, pure fluid devices are able to perform certain sensing and logic functions more efficiently and reliably than any means heretofore available. For example, the very fast response times of certain pure fluid sensors and the ability of all pure fluid devices to operate at very high temperatures has made them ideally suited for use in control systems such as closed loop acceleration controls for tubpojet engines. One of the parameters which has been shown to be useful for controlling the acceleration of a turbojet engine is the temperature compensated engine speed, $N/\sqrt{T}$, where $N$ is the true engine speed and $T$ is the absolute ambient engine temperature. Although measurement of speed and temperature has been accomplished in the prior art with relative simplicity, no simple pure fluid means was heretofore known for computing $N/\sqrt{T}$. Computation means heretofore used in such systems included either moving parts or required that any fluid signals be converted to electrical signals. In either case the computation operation was quite complex.

SUMMARY OF THE INVENTION

The applicant's present invention is a simple pure fluid circuit for sensing and computing the product of functions of two input parameters. In accordance with the teachings of this invention, the sensing and computation operations are accomplished with a minimum number of simple reliable fluid devices. Further, the computation process requires no moving parts and no electrical operations.

The applicant's invention comprises signal means for providing a first train of fluid pressure pulses having a repetition rate which is a unique function of a first input parameter, pulse forming means for producing a second train of fluid pressure pulses having the same repetition rate as the first train of pulses and having a pulse duration dependent on a second input parameter, and a fluid capacitor for integrating the second train of pulses, thereby providing an analog output signal indicative of the repetition rate and the pulse duration of the second train of pulses. The pulse repetition rate and pulse duration of the second train of pulses are independent functions of the first and second input parameters respectively. The analog output signal is, therefore, indicative of the product of functions of the two input parameters.

DESCRIPTION OF THE PREFERRED EMBODIMENT

Figure 1:
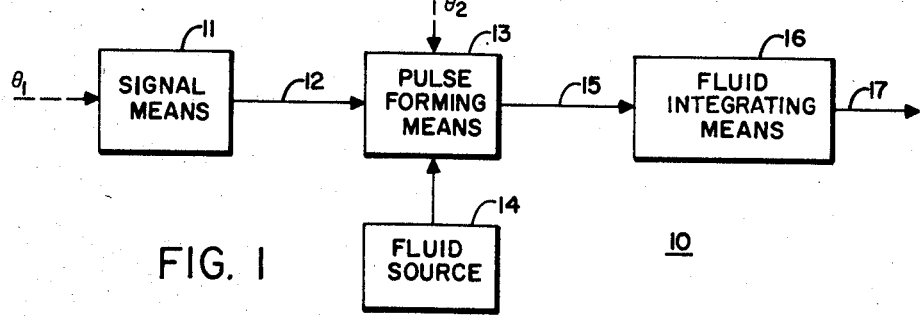
FIGURE 1 is a block diagram of the applicant's pure fluid logic circuit.

In FIGURE 1, reference numeral 10 generally refers to a block diagram of the applicant's pure fluid logic circuit. Reference numeral 11 refers to signal means which senses a first input parameter $\theta_1$. Signal means 11 produces a first train of fluid pressure pulses indicated by reference numeral 12 whose repetition rate $N$ is a unique function of first parameter $\theta_1$. Reference numeral 13 refers to fluid pulse forming means which is supplied with fluid under pressure from a fluid source 14. Pulse forming means 13 receives pulse train 12 from signal means 11 and produces a second train of fluid pressure pulses indicated by reference numeral 15 which has the same repetition rate as pulse train 12 and a pulse duration $W$ which is a unique function of a second input parameter $\theta_2$. Reference numeral 16 refers to fluid integrating means which receives pulse train 15 from pulse forming means 13. Fluid integrating means 16 integrates pulse train 15 and produces an analog output signal indicated by reference numeral 17 whose magnitude $P_0$ is indicative of the pulse repetition rate $N$ and pulse duration $W$ of pulse train 15. The pulse repetition rate $N$ and pulse duration $W$ of pulse train 15 are independent functions of input parameters $\theta_1$ and $\theta_2$ respectively. Therefore, analog output signal $P_0$ is indicative of the product of functions of $\theta_1$ and $\theta_2$.

Figure 2:
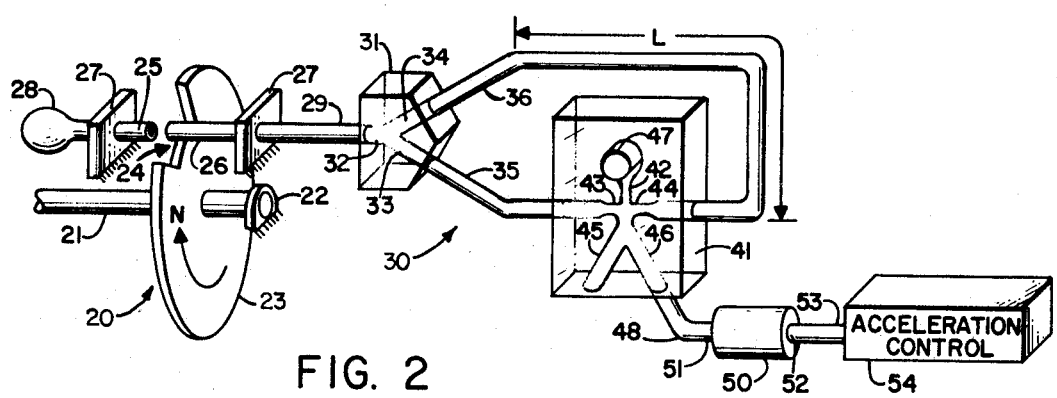
FIGURE 2 is a schematic drawing of a temperature compensated speed sensor utilizing the applicant's pure fluid logic circuit.

FIGURE 2 depicts one embodiment of a temperature compensated speed sensor utilizing the applicant's pure fluid logic circuit. Means for providing a speed signal is generally indicated by reference numeral 20. Speed signal means 20 includes a shaft 21 adapted to rotate in any suitable bearings 22. A disk 23 is fixed to shaft 21 for rotation therewith, and is provided with at least one slot 24 axially therethrough at its periphery. Shaft 21 is driven by any device whose speed is to be sensed (driving means not shown), for example the compressor shaft of a turbojet engine. A fluid emitter 25 is mounted in a fixed position on one side of disk 23. A fluid receiver 26 is mounted in a fixed position on the opposite side of disk 23 from fluid emitter 25 and is aligned therewith. Fluid emitter 25 and fluid receiver 26 are held in position by means of stationary mounts 27. Fluid emitter 25 and fluid receiver 26 are positioned relative to disk 23 such that, as disk 23 turns, the path between fluid emitter 25 and fluid receiver 26 is periodically blocked. Fluid source 28 supplies fluid under pressure to fluid emitter 25, resulting in a stream of fluid issuing therefrom. It is apparent that if disk 23 rotates when fluid is being emitted from fluid emitter 25, the fluid stream from fluid emitter 25 will be periodically interrupted and a train of fluid pressure pulses will be generated in fluid receiver 26. It is further apparent that the repetition rate of this pulse train will be proportional to the speed of disk 23, and consequently, indicative of the speed of means driving disk 23. The function of disk 23 can also be achieved through other means. For example, disk 23 may have apertures therethrough rather than a slot at its periphery or an integral part of the device whose speed is to be sensed may be provided with apertures or slots and made to perform the function of interrupting the fluid stream.

Reference numeral 30 generally refers to means for forming fluid pulses. Fluid pulses forming means 30 includes a Y junction 31, a short control passage 35, a longer control passage 36 and a monostable fluid amplifier 41. Y junction 31 has an inlet conduit 32 and two outlet legs 33 and 34. Monostable fluid amplifier 41 has a power nozzle 42, a first control port 43, a second control port 44, a preferred outlet conduit 45 and a nonpreferred outlet conduit 46. Body Y junction 31 and fluid amplifier 41 are illustrated as being constructed of a transparent material to show the interior passageways. However, they may be constructed of any suitable materials and may embody construction features not shown in the illustration.

Fluid receiver 26 of speed signal means 20 is connected to inlet conduit 32 of Y junction 31 by means of a fluid duct 29. Control port 43 of fluid amplifier 41 is connected to outlet leg 33 of Y junction 31 through short control passage 35. Control port 44 of amplifier 41 is connected to outlet leg 34 of Y junction 31 through longer control passage 36. Reference character L represents the difference in length of control passages 35 and 36. Power nozzle 42 of fluid amplifier 41 is adapted to be supplied with fluid under pressure from a fluid source (not shown) through supply passage 47 and thereby caused to issue a stream of fluid. In the absence of a pressure differential at control ports 43 and 44 of monostable fluid amplifier 41, fluid issuing from power nozzle 42 will flow out of preferred outlet conduit 45. A fluid duct 48 connects nonpreferred outlet conduit 46 of fluid amplifier 41 to inlet tube 51 of a fluid capacitor 50. Outlet tube 52 of fluid capacitor 50 is connected to input 53 to an acceleration control 54.

In operation, when a fluid pressure pulse is generated in fluid receiver 26 due to rotation of disk 23, the pulse will be transmitted along duct 29 and will divide at Y junction 31, a portion thereof entering control passage 35 and a portion entering control passage 36. Since control passage 35 is shorter than control passage 36, the leading edge of the input pressure pulse will generally reach control port 43 first in time, thereby switching the output of amplifier 41 to nonpreferred outlet passage 46. After a length of time W, governed by the length L by which control passage 36 is longer than control passage 35 and the acoustical velocity C in the working fluid, the leading edge of the input pressure pulse will reach control port 44 thereby switching the output from amplifier 41 back to preferred outlet conduit 45. Therefore, W is the duration of the pulses in nonpreferred outlet conduit 46. Further, $W=L/C$. Since the length L is fixed, the duration of the output pulses in nonpreferred outlet conduit 46 is a function of only the acoustic velocity C in the working fluid. Further, W is inversely proportional to C. The acoustic velocity C in terms of the absolute temperature T of the working fluid is given by, $C=K\sqrt{T}$ where K is a constant. Therefore, $$W=\frac{L}{K\sqrt{T}}$$

Figure 3:
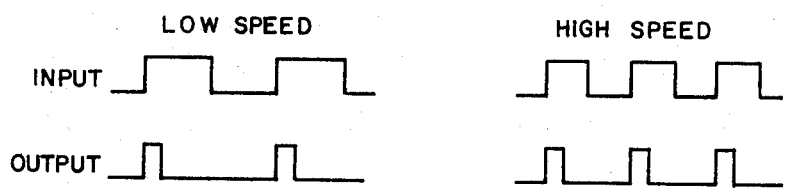
FIGURE 3 shows the input and output pulse trains of the fluid pulse forming means for low and high speed operation of the temperature compensated speed sensor at a constant temperature.
Figure 4:
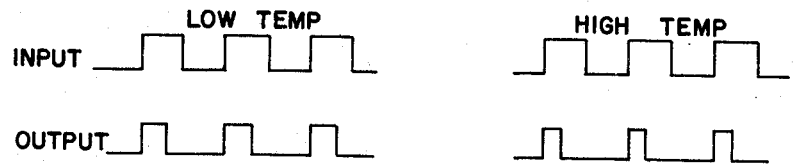
FIGURE 4 shows the input and output pulse trains of the fluid pulse forming means for low and high temperatures of the temperature compensated speed sensor at a constant operating speed.

It should be noted that the duration of the output pulses in nonpreferred outlet conduit 46 is not dependent on the duration of the input pulses, provided the duration of the input pulses is at least as long as the delay time provided by control passage 36. FIGURE 3 illustrates the input and output pressure pulse trains of pulse forming means 30 for low and high speed operation at a constant temperature.

When temperature compensated speed sensor 20 is used in an acceleration control system for a turbojet engine, fluid source 28 may be the fluid environment of the engine. The absolution temperature T of the working fluid in control passages 35 and 36 will, therefore, be essentially the ambient environmental temperature of the engine. Further, the temperature of the fluid in control passages 35 and 36 will vary in accordance with the ambient environmental temperature of the engine. In other applications where temperature is the second parameter being sensed, other methods may be used for providing the temperature input. For example, a heat exchanger may be used in duct 29 to vary the temperature of the working fluid.

As the absolute temperature T of the working fluid increases, it can be seen that the acoustic velocity C in the working fluid will also increase as the square root of the absolute temperture T. Since the pulse duration W is inversely proportional to the acosutic velocity C, the pulse duration W will decrease in proportion to the increase in the square root of the absolute temperature T. FIGURE 3 illustrates input and output pressure pulse trains of pulse forming means 30 for low and high temperatures at a constant operating speed.

Fluid capacitor 50 functions to integrate the output pressure pulse train from nonpreferred outlet conduit 46 of amplifier 41 and to convert it to an analog pressure signal $P_0$. Analog pressure output signal $P_0$ of fluid capacitor 50 is indicative of the pulse duration W, pulse repetition rate N and pulse amplitude $P_i$ of the output pulse train from nonpreferred outlet passage 46. Analog output signal $P_0$ is given by the expression, $$P_0=P_i \cdot N \cdot W$$

In terms of the absolute temperature of the working fluid, the analog output signal $P_0$ is given by the expression $$P_0=P_i \cdot N \cdot \frac{L}{K\sqrt{T}}$$

If the supply pressure of fluid source 47 is constant, the pulse amplitude $P_i$ of the output pulses from amplifier 41 will be constant. It is, therefore, apparent that the analog pressure output $P_0$ of fluid capacitor 50 is indicative of the output pulse repetition rate and consequently, indicative of the speed of means of driving disk 23. Analog pressure output $P_0$ is also indicative of the square root of the absolute temperature of the working fluid. Thus, the analog pressure output $P_0$ of fluid capacitor 50 is indicative of the temperature compensated speed of means driving disk 23. The applicant has hereby provided a simple pure fluid means of dividing a true speed signal by the square root of the absolute temperature.

It is apparent that this concept is not limited to temperature compensated speed sensing, but can also be used in any situation where a variable must be divided by the square root of the absolute temperature. It is also apparent that for constant temperature applications, this system can be used as a generalized frequency to analog converter. It is further apparent that this system can generally be used to sense two input parameters and provide an analog output which is indicative of the product of functions of the two parameters.

Although the applicant's invention has been described and illustrated in detail, it should be understood that the same is by way of illustration and example only and it is not to be taken by way of limitation. The spirit and the scope of this invention are limited only by the terms of the following claims.

I claim:
1. A pure fluid temperature compensated speed sensor comprising:
  signal means including an outlet passage, said signal means for producing at said outlet passage a first train of fluid pressure pulses whose repetition rate is indicative of the speed of apparatus whose speed is being sensed;

fluid pulse forming means having an inlet conduit and an outlet conduit;

means connecting said outlet passage of said signal means to said inlet conduit of said fluid pulse forming means, said fluid pulse forming means being operable to receive said first train of fluid pressure pulses at said inlet conduit and produce therefrom at said outlet conduit a second train of fluid pressure pulses having the same repetition rate as said first train of fluid pressure pulses and having a pulse duration indicative of the square root of the absolute temperature of the working fluid;

fluid capacitance means having an inlet and an outlet tube;

means connecting said outlet conduit of said pulse forming means to said inlet tube of said fluid capacitance means, said fluid capacitance means being operable to receive at said inlet tube and integrate said second train of fluid pressure pulses, providing therefrom at said outlet tube an analog output signal indicative of the speed of the apparatus whose speed is being sensed and the absolute temperature of the working fluid; and control means connected to said outlet tube of said fluid capacitance means for utilizing said analog output signal.

2. The speed sensor of claim 1 wherein:

said signal means comprises a disk adapted to rotate about its axis of revolution at an angular velocity proportional to the speed of apparatus whose speed is being sensed, said disk having at least one slot axially therethrough at its periphery;

a stationary fluid emitter adapted to be connected to a source of fluid under pressure and so oriented that said slot is periodically aligned therewith upon rotation of said disk; and a fluid receiver aligned with said fluid emitter on the opposite side of said disk from said fluid emitter for receiving fluid therefrom whereby, upon emission of fluid from said fluid emitter and rotation of said disk, a train of fluid pressure pulses having a repetition rate indicative of the angular velocity of said disk and the speed of the apparatus whose speed is being sensed is produced.

3. The speed sensor of claim 1 wherein:

said pulse forming means comprises a Y junction having an inlet conduit and first and second outlet legs;

a monostable fluid amplifier having a power nozzle adapted to be connected to a source of fluid under pressure and thereby caused to issue a stream of fluid, first and second control ports, and preferred and nonpreferred outlet conduits for receiving the stream of fluid;

a short control passage connecting said first outlet leg of said Y junction to said first control port of said monostable fluid amplifier; and a longer control passage connecting said second outlet leg of said Y junction to said second control port of said monostable fluid amplifier, said pulse forming means operating such that when a fluid pressure pulse is transmitted to said inlet conduit of said Y junction, portions thereof will enter both said short and said longer control passages, the portion entering said short control passage being transmitted to said first control port of said monostable fluid amplifier, thereby causing a stream of fluid issuing from said power nozzle to be delivered out of said nonpreferred outlet conduit, and the portion entering said longer control passage being transitted to said second control port of said monostable fluid amplifier, thereby causing the stream of fluid issuing from said power nozzle to be transferred away from said nonpreferred outlet conduit after a time indicative of the absolute temperature of the fluid in said short and longer control passages.

4. The speed sensor of claim 1 wherein: said control means comprises an acceleration control system for a turbojet engine.

5. A pure fluid logic circuit comprising:

signal means for producing an input pulse train having a repetition rate which varies in accordance with variations in a first parameter;

a Y-junction having an inlet conduit and first and second outlet legs;

a monostable fluid amplifier having a power nozzle adapted to be connected to a source of fluid under pressure and thereby caused to issue a fluid stream, first and second oppositely acting control ports, and preferred and nonpreferred outlet conduits for receiving the fluid stream;

a short control passage connecting the first outlet leg of said Y-junction to the first control port of said monostable fluid amplifier;

a longer control passage connecting the second outlet leg of said Y-junction to the second control port of said monostable fluid amplifier, the circuit formed by said Y-junction, said short control passage, said longer control passage and said monostable fluid amplifier operating such that when a fluid pressure pulse is transmitted to the inlet conduit of said Y-junction, portions thereof will enter both said short and said longer control passages, the portion entering said short control passage being transmitted to the first control port of said monostable fluid amplifier, thereby causing a fluid stream issuing from the power nozzle to be delivered out of the nonpreferred outlet conduit, and the portion entering said longer control passage being transmitted to the second control port of said monostable fluid amplifier, thereby causing the fluid stream issuing from the power nozzle to be transferred away from the nonpreferred outlet conduit after a time dependent on a variable property of the fluid in said short and longer control passages, the property varying in accordance with a second parameter so as to provide a resultant pulse train at each of the preferred and nonpreferred outlet conduits having a repetition rate and a pulse width which vary independently according to first and second parameters respectively; and fluid pulse train integrating means connected to receive the resultant pulse train from at least one of the preferred and nonpreferred outlet conduits, said integrating means operable to produce therefrom an analog output signal indicative of a function of the first and second parameters.

References Cited

UNITED STATES PATENTS

| 3,228,410 | 1/1966 | Warren et al. | 137—81.5 |
| 3,233,522 | 2/1966 | Stern | 137—81.5 XR |
| 3,260,271 | 7/1966 | Katz | 137—81.5 XR |
| 3,266,510 | 8/1966 | Wadey | 137—81.5 |
| 3,292,648 | 12/1966 | Colston | 137—81.5 XR |
| 3,302,398 | 2/1967 | Taplin et al. | 137—81.5 XR |
| 3,379,204 | 4/1968 | Kelley et al. | 137—81.5 |
| 3,393,692 | 7/1968 | Geary | 137—81.5 XR |

SAMUEL SCOTT, Primary Examiner